United States Patent [19]

Rabkin

[11] Patent Number: 5,502,909
[45] Date of Patent: Apr. 2, 1996

[54] VEHICLE EMERGENCY SIGN

[76] Inventor: Vladimir G. Rabkin, 1414 30th Ave. #5, San Francisco, Calif. 94122

[21] Appl. No.: 351,680

[22] Filed: Dec. 8, 1994

[51] Int. Cl.[6] .............................. G09F 21/04; G09F 17/00
[52] U.S. Cl. ................... 40/603; 40/597; 40/606; 40/610; 40/591; 403/84
[58] Field of Search ............................ 40/603, 604, 591, 40/592, 597, 602, 606, 610; 248/205.5, 206.2; 403/84, 83

[56] References Cited

U.S. PATENT DOCUMENTS

| | | | |
|---|---|---|---|
| 2,887,983 | 5/1959 | Budd | 40/602 |
| 3,080,166 | 3/1963 | Clark | 40/603 |
| 3,347,573 | 10/1967 | Carter | 403/84 |
| 4,777,750 | 10/1988 | Garfinkle | 40/606 X |

*Primary Examiner*—Kenneth J. Dorner
*Assistant Examiner*—Cassandra Davis

[57] ABSTRACT

A sign for alerting passing motorists to the operational condition of a vehicle. The inventive device includes a mounting assembly securable to an exterior surface of the vehicle. An adjustable support post is removably coupled to the mounting assembly so as to extend from the vehicle. A sign is removably coupled to the support post and includes distress signals printed thereon for alerting the passing motorists. The sign can be supported by a pair of support assemblies and may be either rectangular or triangular in shape.

5 Claims, 7 Drawing Sheets

VEHICLE EMERGENCY SIGN

BACKGROUND OF THE INVENTION

1. Field of the Invention

The present invention relates to sign structures and more particularly pertains to sign structures for alerting passing motorists to the operational condition of a vehicle.

2. Description of the Prior Art

The use of sign structures is known in the prior art. More specifically, sign structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art sign structures include U.S. Pat. No. 5,249,381; U.S. Pat. No. 4,858,551; U.S. Pat. No. 4,633,215; U.S. Pat. No. 4,325,318; and U.S. Pat. No. 4,157,531.

While these devices fulfill their respective, particular objectives and requirements, the aforementioned patents do not disclose a vehicle emergency sign for alerting passing motorists to the operational condition of a vehicle which includes a mounting assembly securable to an exterior surface of the vehicle, an adjustable support post coupled to the mounting assembly so as to extend from the vehicle, and a sign removably coupled to the support post and including distress signals printed thereon for alerting the passing motorists to an emergency condition.

In these respects, the vehicle emergency sign according to the present invention substantially departs from the conventional concepts and designs of the prior art, and in so doing provides an apparatus primarily developed for the purpose of alerting passing motorists to operational condition of a vehicle.

SUMMARY OF THE INVENTION

In view of the foregoing disadvantages inherent in the known types of sign structures now present in the prior art, the present invention provides a new vehicle emergency sign construction wherein the same can be utilized for alerting passing motorists to the operational condition of a vehicle or an emergency situation. As such, the general purpose of the present invention, which will be described subsequently in greater detail, is to provide a new vehicle emergency sign apparatus and method which has many of the advantages of the sign structures mentioned heretofore and many novel features that result in a vehicle emergency sign which is not anticipated, rendered obvious, suggested, or even implied by any of the prior art sign structures, either alone or in any combination thereof.

To attain this, the present invention generally comprises a sign for alerting passing motorists to the operational condition of a vehicle. The inventive device includes a mounting assembly securable to an exterior surface of the vehicle. An adjustable support post is removably coupled to the mounting assembly so as to extend from the vehicle. A sign is removably coupled to the support post and includes distress signals printed thereon for alerting the passing motorists. The sign can be supported by a pair of support assemblies and may be either rectangular or triangular in shape.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle emergency sign apparatus and method which has many of the advantages of the sign structures mentioned heretofore and many novel features that result in a vehicle emergency sign which is not anticipated, rendered obvious, suggested, or even implied by any of the prior art sign structures, either alone or in any combination thereof.

It is another object of the present invention to provide a new vehicle emergency sign which may be easily and efficiently manufactured and marketed.

It is a further object of the present invention to provide a new vehicle emergency sign which is of a durable and reliable construction.

An even further object of the present invention is to provide a new vehicle emergency sign which is susceptible of a low cost of manufacture with regard to both materials and labor, and which accordingly is then susceptible of low prices of sale to the consuming public, thereby making such vehicle emergency signs economically available to the buying public.

Still yet another object of the present invention is to provide a new vehicle emergency sign which provides in the apparatuses and methods of the prior art some of the advantages thereof, while simultaneously overcoming some of the disadvantages normally associated therewith.

Still another object of the present invention is to provide a new vehicle emergency sign for alerting passing motorists to the operational condition of a vehicle and/or an emergency situation.

Yet another object of the present invention is to provide a new vehicle emergency sign which includes a mounting assembly securable to an exterior surface of the vehicle, an adjustable support post coupled to the mounting assembly so as to extend from the vehicle, and a sign removably coupled to the support post and including distress signals printed thereon for alerting the passing motorists to an emergency condition.

Even still another object of the present invention is to provide a new vehicle emergency sign of the aforementioned structure which can be supported by a pair of support assemblies and may be either rectangular or triangular in shape.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1–17 thereof, a new vehicle emergency sign embodying the principles and concepts of the present invention and generally designated by the reference numeral 10 will be described.

Figure 1:
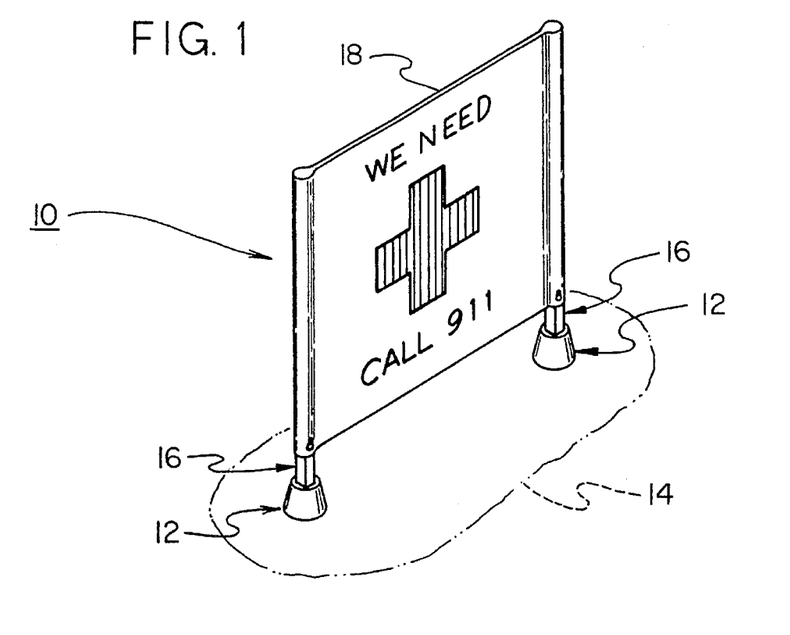
FIG. 1 is an isometric illustration of a vehicle emergency sign according to the present invention.
Figure 4:
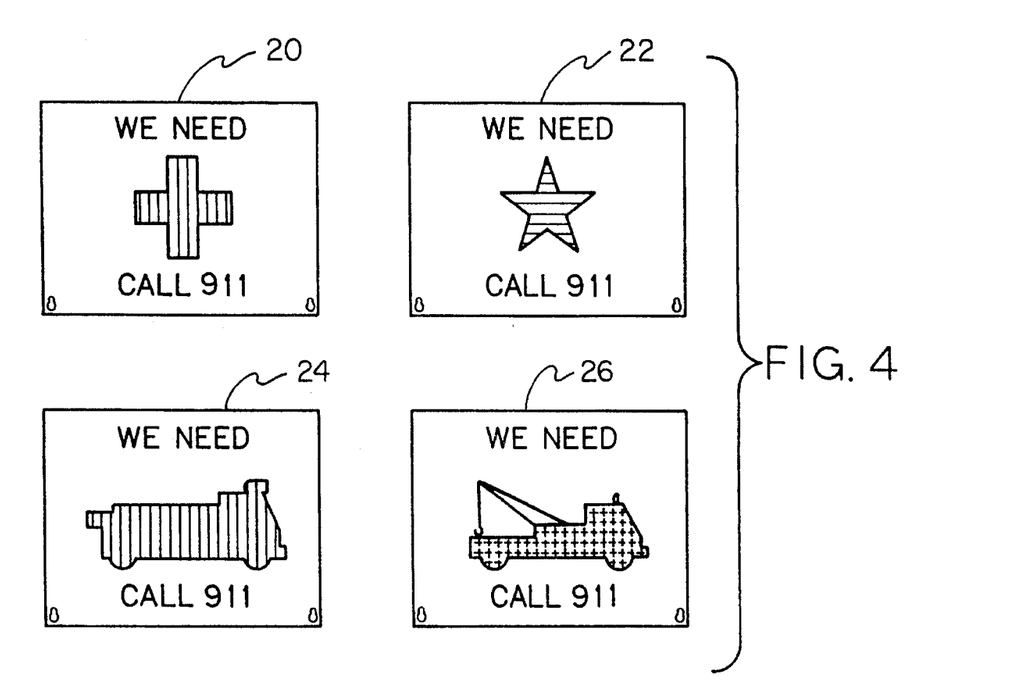
FIG. 4 is a front elevation view of a plurality of distress signs included with the present invention.

More specifically, it will be noted that the vehicle emergency sign 10 comprises a mounting means 12 for engaging and securing a support surface 14, such as an exterior surface of a vehicle or the like. An adjustable support post 16 is removably coupled to the mounting means 12 and is supported thereby in a substantially orthogonal orientation relative to the support surface 14. A rectangular sign 18 is coupled to the adjustable support posts 16 and supported in a vertical orientation thereby for viewing by a passing motorist or the like. Preferably, the present invention 10 utilizes a pair of spaced mounting means 12 supporting a spaced pair of adjustable support posts 16 such that the rectangular sign 18 is supported at respectively opposed lateral edges thereof. As illustrated in FIG. 4, the sign 18 may include a red cross for requesting an ambulance as at 20, a blue star for requesting police as at 22, a red fire engine for requesting the fire department as at 24, or a yellow truck for requesting a tow truck as at 26, for example. By this structure, any one of a plurality of rectangular signs 18 may be engaged as shown in FIG. 1 to the support posts 16 and mounting means 12 to support the same in a position for viewing, whereby a passing motorist or the like will assist the disabled vehicle.

Figure 2:
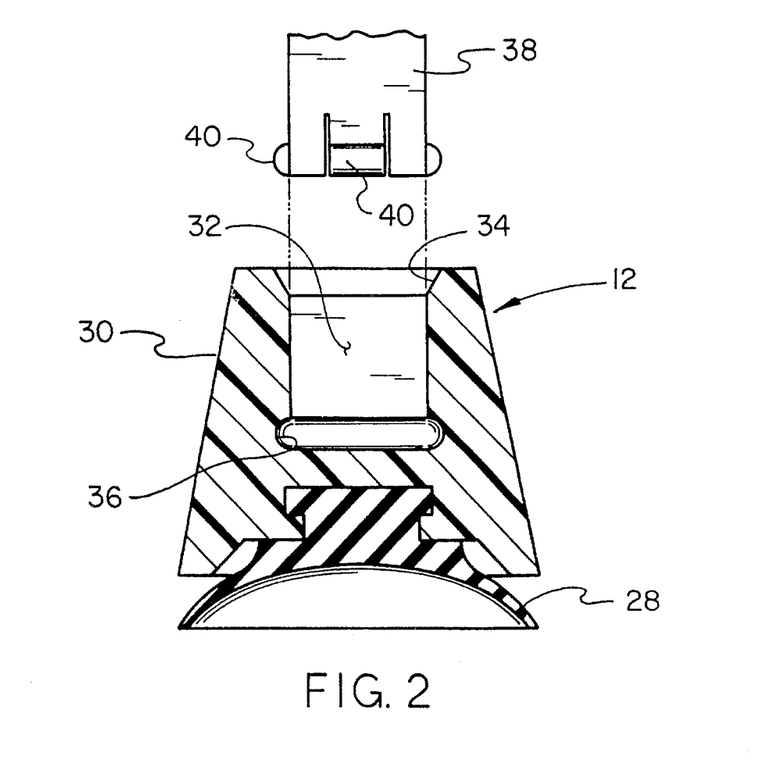
FIG. 2 is a cross sectional view of a mounting means comprising a portion of the present invention.
Figure 3:
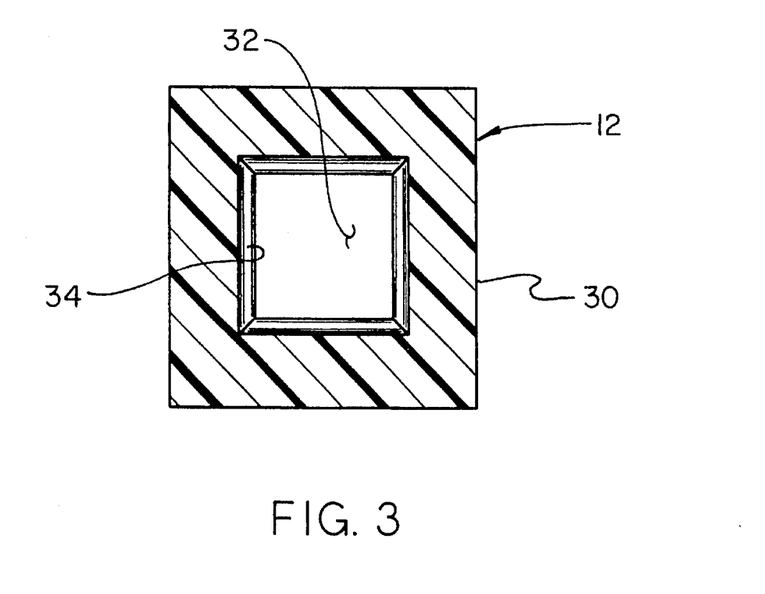
FIG. 3 is a cross sectional view of the mounting means illustrating an alternative exterior shape thereof.

As best illustrated in FIG. 2, the mounting means 12 preferably comprises a suction cup 28 which can be releasably coupled to the support surface 14 in a well understood manner. A mounting boss 30 is secured to the suction cup 28 and includes a hollow center cavity 32 initiated by a tapered edge 34 and terminating at an interior groove 36 extending around a lower perimeter of the center cavity. As shown in FIG. 3, the center cavity 32 is preferably square in shape, with an exterior of the mounting boss 30 being either square or circular, as shown in FIG. 1.

Figure 6:
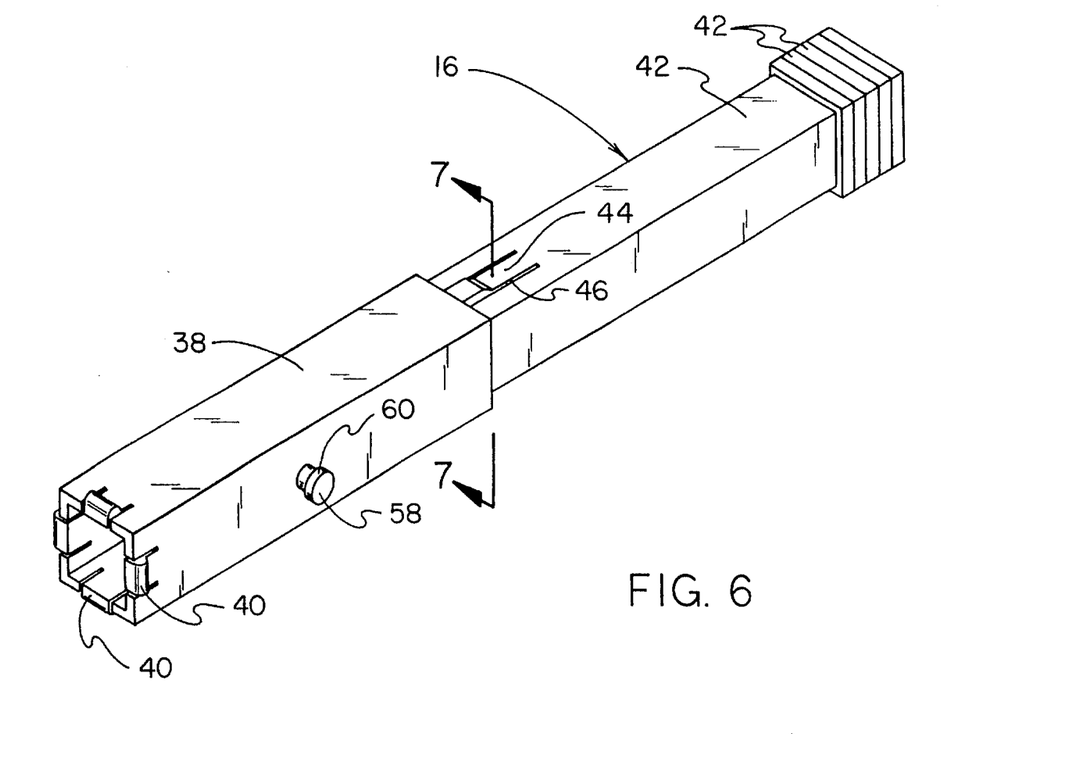
FIG. 6 is an isometric illustration of an adjustable support post comprising a portion of the present invention.

As best illustrated in FIG. 6, the adjustable support posts 16 each comprise a base section 38 of substantially square cross section which is receivable within the center cavity 32 of the mounting boss 30. To this end, a lower end of the base section 38 is provided with a plurality of flexible tabs 40 defined by spaced pairs of unlabeled longitudinal slots with semi-circular projections extending between the slots which are received within the groove 36 of the mounting boss 30. By this structure, the base section 38 is removably coupled to the mounting means 12, whereby the device 10 may be collapsed or deconstructed for storage and/or travelling purposes.

Figure 7:
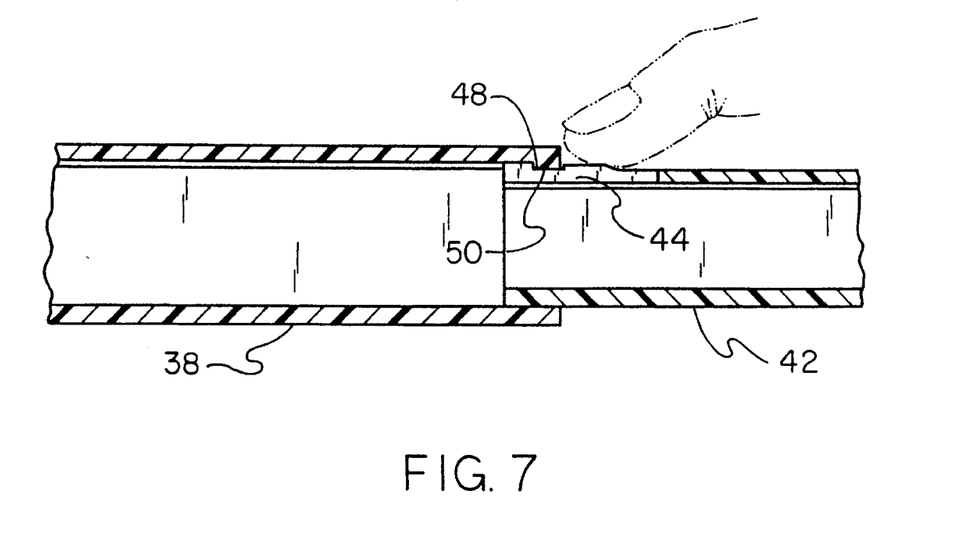
FIG. 7 is a cross sectional view taken along line 7—7 of FIG. 6.
Figure 8:
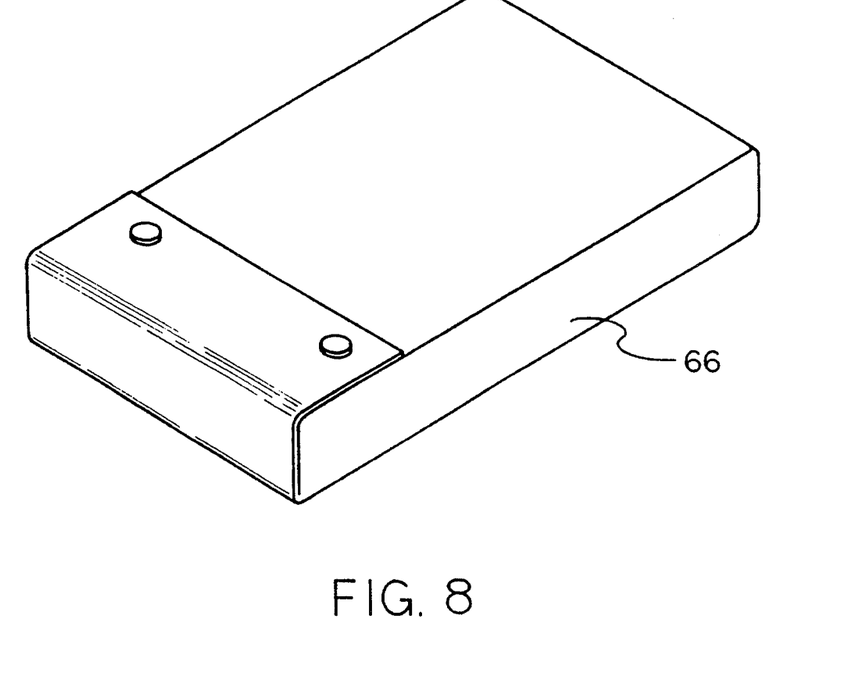
FIG. 8 is an isometric illustration of a storage case of the present invention.

With continuing reference to FIG. 6 and concurrent reference to FIG. 7, it can be shown that the adjustable support posts 16 further comprise a plurality of telescoping sections 42 slidably received one within another. Each of the telescoping sections 42 includes a locking tab 44 defined by a further pair of spaced longitudinal slots 46 positioned at a first end thereof. The telescopic sections 42, as well as the base section 38 additionally include an interior projection 48 at a second or upper end thereof. As shown in FIG. 7, a locking tab 44 includes a transverse slot 50 which receives the interior projection 48 of the section 38 or 42 within which the particular telescoping section 42 is received. In other words, the telescoping sections 42 are of a similar construction and include the structure shown in FIG. 7 to effect extension and locking thereof relative to receiving telescoping sections 42 or the base section 38. By this structure, the adjustable support posts 16 can be selectively collapsed into a compact configuration for storing and/or transportation thereof.

Figure 5:
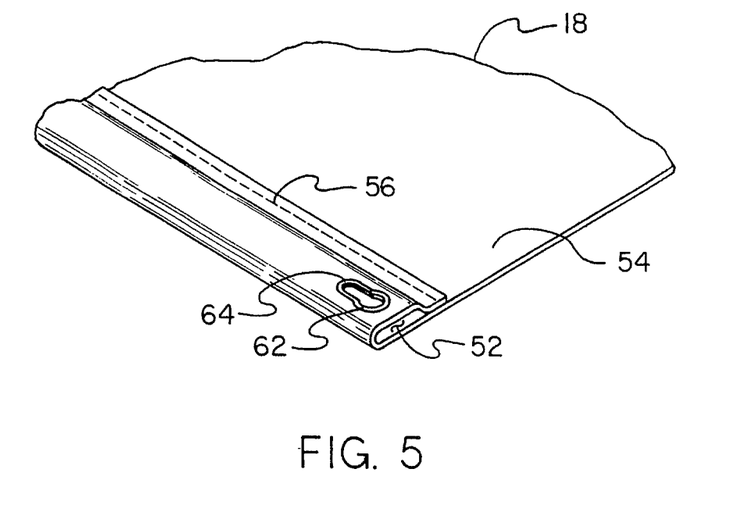
FIG. 5 is an enlarged isometric illustration of a portion of the sign.

To removably couple the rectangular sign 18 to the adjustable support posts 16, the rectangular sign is provided with a pair of opposed lateral pockets 52, as shown in FIG. 5, defined by a portion of the sign web 54 folded onto itself and secured thereto by stitching 56. The stitching 56 extends along the side of the lateral pocket 52 and across a top thereof to preclude a projection of the uppermost telescoping section 42 through a top of the lateral pocket. To preclude unintentional removal of the sign 18 from the adjustable support posts 16, each of the base sections 38 of the adjustable support posts is provided with a mounting projection 58 extending therefrom. The mounting projection 58 includes an enlarged head 60 which can be positioned through a first aperture 62 formed in the web material 54 of the lateral pocket 52. A second aperture 64 extending into contiguous communication with the first aperture 62 receives the mounting projection 58 but precludes passage of the enlarged head 60 therethrough. In other words, the first aperture 62 is of a first transverse diameter and the second aperture 64 is of second transverse diameter, wherein the first diameter is substantially greater than the second diameter to permit passage of the enlarged head 63 through the first aperture, and to preclude passage of the enlarged head through the second aperture. By this structure, the adjustable support post 16 can be inserted into the lateral pocket 52, wherein the enlarged head 60 of the mounting projection 58 can be positioned through the first aperture 62 and slid into the second aperture to secure the sign 18 to the support post 16. Because the vehicle emergency sign 10 is of a collapsible construction, the entire device can be collapsed and stored within a single storage case 66 (see FIG. 8) positionable within a glove compartment or the like of the associated vehicle.

Figure 9:
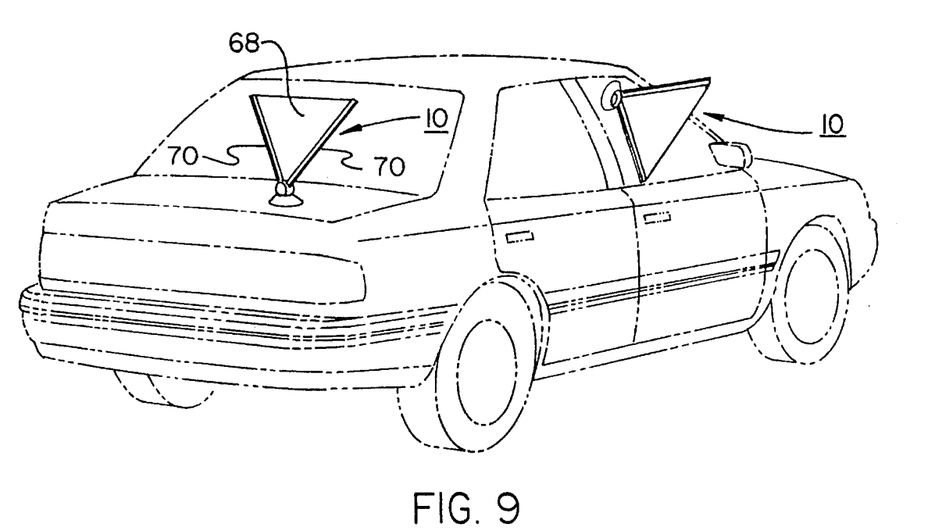
FIG. 9 is an isometric illustration of an alternative form of the vehicle emergency sign.
Figure 10:
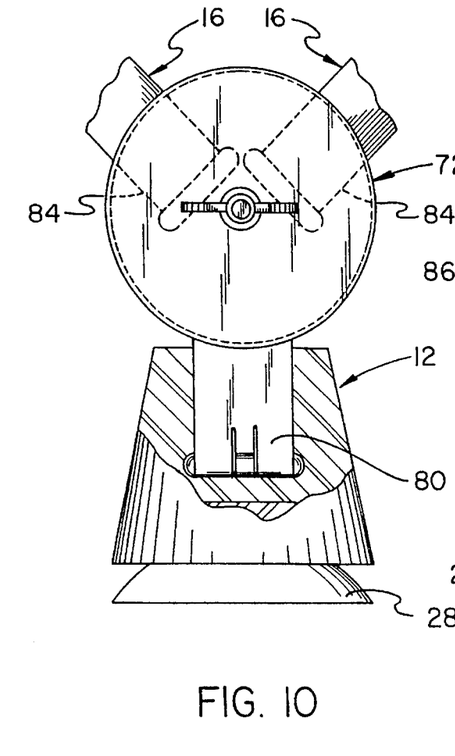
FIG. 10 is a front elevation view of an angle adjustment means comprising a portion of the alternative form of the vehicle emergency sign.
Figure 11:
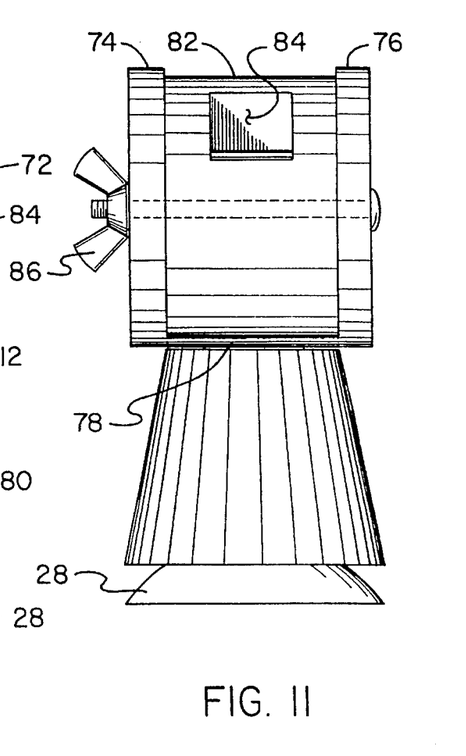
FIG. 11 is a side elevation view of the angle adjustment means as coupled to the mounting means.
Figure 12:
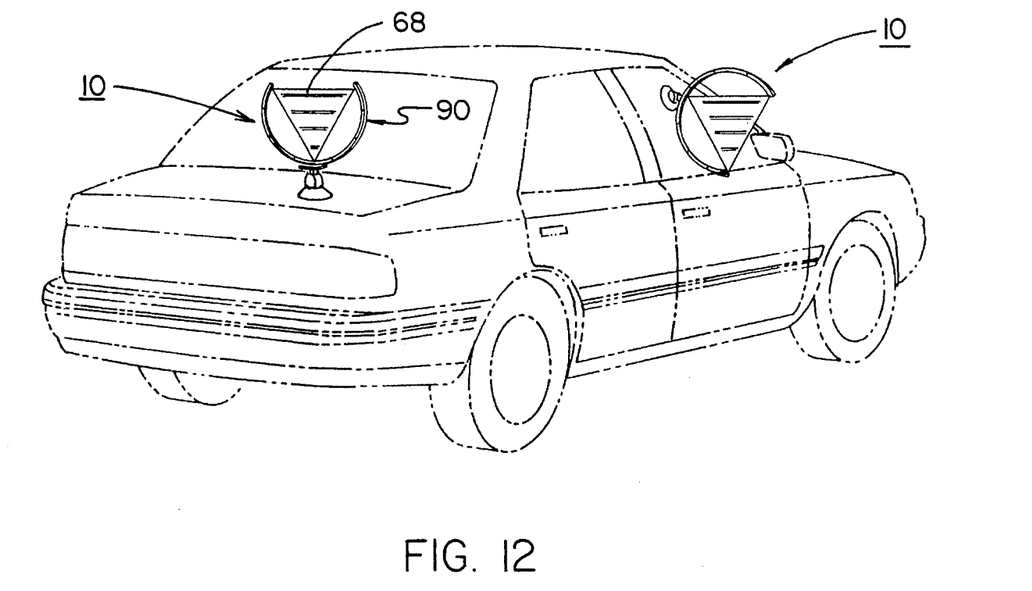
FIG. 12 is an isometric illustration of a further alternative form of the vehicle emergency sign.

Referring now to FIGS. 9 through 11, it can be shown that the present invention may take the form of a triangular sign 68 having the lateral pockets 70 formed at oblique angles relative to one another. In this alternative form of the present invention 10, the adjustable support posts 16 are received within the lateral pockets 70 and, instead of being mounted directly to the mounting means 12, are coupled to an angle adjustment means 72 for permitting an angular adjustment of the support posts 16 relative to the mounting means 12. To this end, the angle adjustment means 72 comprises a first circular member 74 spaced from a second circular member 76. The first and second circular members 74, 76 are coupled together at a lower end thereof by a joiner 78 extending therebetween. A joiner mount 80 orthogonally extends from the joiner 78 and is received within the center cavity 32 of the mounting means 12. A rotational member 82 is positioned between the circular member 74 and 76 and includes a pair of orthogonally oriented rotational member cavities 84 which receive the base section 38 of an individual support post 16. An adjustment fastener 86 is directed through the rotational member 82, as well as the first and second circular member 74 and 76 and can be selectively tightened to secure a position of the rotational member 82 relative to the circular members. By this structure, the triangular 68 may be positioned at any desired angle relative to the mounting means 12 and thus, the support surface 14 as desired.

Figure 13:
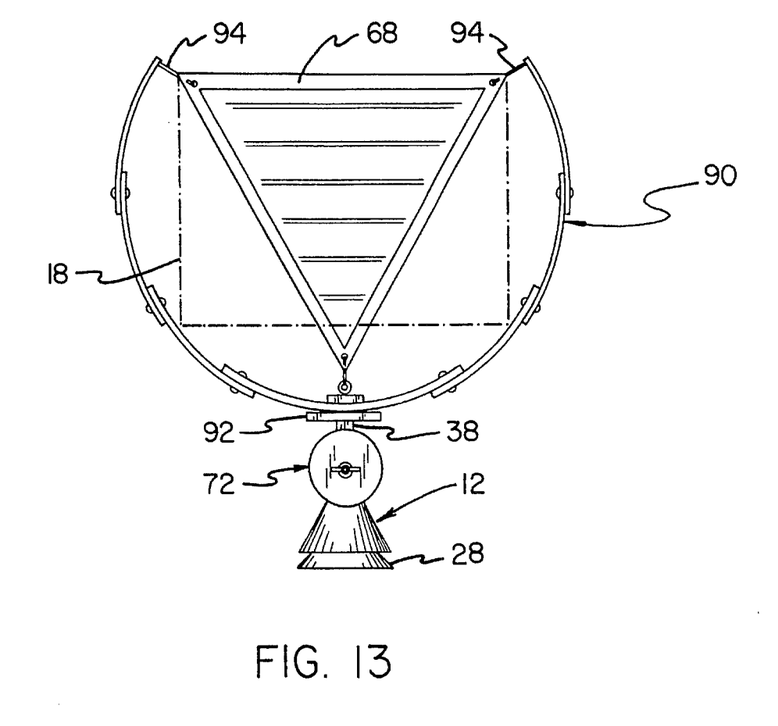
FIG. 13 is a front elevation view of the further alternative form of the vehicle emergency sign.
Figures 14, 15, 16, 17:
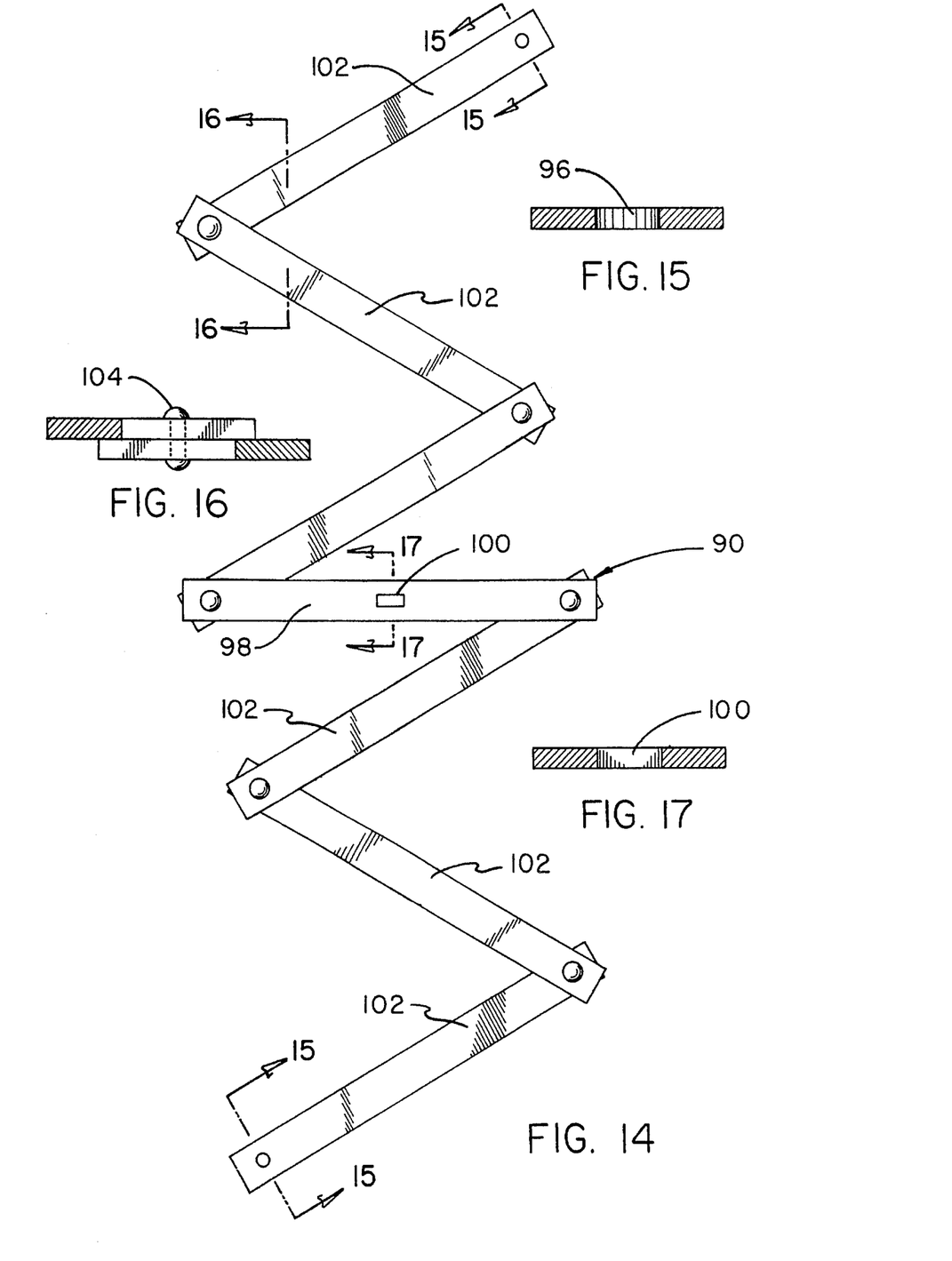
FIG. 14 is a plan view of a folding support assembly.
FIG. 15 is a cross sectional view taken along line 15—15 of FIG. 14.
FIG. 16 is a cross sectional view taken along line 16—16 of FIG. 14.
FIG. 17 is a cross sectional view taken along line 17—17 of FIG. 14.

As shown in FIGS. 12 through 17, the invention 10, in lieu of the adjustable support posts, may alternatively comprise a folding support assembly 90 mounted to a base section 38 by a coupler 92. The base section 38 is received within one of the rotational member cavities 84 of the angle adjustment means 72 so as to support the folding support assembly relative to the mounting means substantially as shown in FIG. 13. The triangular or rectangular sign 68 or 18 can thus be coupled to the folding support assembly by mounting clips 94 engaged to both the sign and mounting holes 96 extending through portions of the folding support assembly. As shown in FIGS. 14 through 17, the folding support assembly comprises a center member 98 having a rectangular mounting aperture 100 through which a portion of the coupler 92 extends. A plurality of lateral members 102 are pivotally coupled in sequence to opposed ends of the center member 98 by pivotal fasteners 104 extending therethrough. By this structure, the lateral members 102 of the folding support assembly can be pivotally compacted for storage. The lateral members 102 must be constructed either of a resilient material permitting deformation thereof into the arcuate shape for support of the sign 68 or 18, or alternatively, the lateral members 102 can simply be rigidly formed into an arcuate configuration.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicle emergency sign comprising:

A mounting means for engaging and securing a support surface, said mounting means having a hollow central cavity therein;

a sign means for displaying indicia;

an adjustable support post means removeably coupled to said mounting means and supported thereby for supporting said sign means relative to said support surface;

an angle adjustment means interposed between said mounting means and said adjustable support post means for permitting an angular adjustment of said support post means relative to said mounting means, said angle adjustment means comprising a first circular member spaced from a second circular member; a joiner coupling said first and second circular members together at lower ends thereof; a joiner mount extending orthogonally from said joiner and being received within said center cavity of said mounting means; a rotational member positioned between said circular members and including an orthogonally oriented rotational member cavity which receive said base section of said support post means; and an adjustment fastener directed through said rotational member and said first and second circular members.

2. The vehicle emergency sign of claim 1, wherein said sign means includes a red cross for requesting an ambulance.

3. The vehicle emergency sign of claim 1, wherein said sign means includes a blue star for requesting police.

4. The vehicle emergency sign of claim 1, wherein said sign means includes a red fire engine for requesting a fire department.

5. The vehicle emergency sign of claim 1, wherein said sign means includes a yellow truck for requesting a tow truck.

* * * * *